United States Patent [19]

Mendiratta et al.

[11] Patent Number: 4,603,194

[45] Date of Patent: Jul. 29, 1986

[54] ISOLATION OF POLYMER RESIN FROM ORGANIC SOLUTION

[75] Inventors: Ashok K. Mendiratta, Schenectady; Wayne F. Morgan, Mechanicville, both of N.Y.

[73] Assignee: General Electric Company, Schenectady, N.Y.

[21] Appl. No.: 751,777

[22] Filed: Jul. 5, 1985

Related U.S. Application Data

[63] Continuation-in-part of Ser. No. 677,111, Nov. 30, 1984, abandoned.

[51] Int. Cl.[4] ............................................. C08J 3/00
[52] U.S. Cl. ................................... 528/491; 528/196; 528/496; 528/497; 528/499; 528/501; 528/502; 528/212
[58] Field of Search ............... 528/491, 496, 497, 499, 528/501, 502, 196

[56] References Cited

U.S. PATENT DOCUMENTS

| | | | |
|---|---|---|---|
| 3,267,074 | 8/1966 | Wood | 528/499 |
| 3,590,026 | 6/1971 | Carlson et al. | 260/94.7 |
| 3,954,713 | 5/1976 | Schnöring | 260/47 XA |
| 4,205,162 | 5/1980 | Hercoviel | 528/499 |
| 4,408,040 | 10/1983 | Flock et al. | 528/500 |
| 4,423,207 | 12/1985 | Flock et al. | 528/499 |

FOREIGN PATENT DOCUMENTS 0095670  5/1983  European Pat. Off. .

*Primary Examiner*—Harold D. Anderson
*Attorney, Agent, or Firm*—Richard J. Traverso; James C. Davis, Jr.; James Magee

[57] ABSTRACT

A method of isolating polymer resins from organic solvents is provided wherein the organic solvent is volatilized in the presence of an aqueous slurry of solid polymer particles of a particular size which provide agglomeration sites for the polymer resin within solution. The process can function continuously with various polymers including polycarbonates, polystyrene, polyetherimides, polyphenylene ethers, polyesters, etc.

42 Claims, 2 Drawing Figures

ISOLATION OF POLYMER RESIN FROM ORGANIC SOLUTION

This application is a continuation-in-part application of Ser. No. 677,111, filed Nov. 30, 1984, now abandoned.

CROSS REFERENCE TO RELATED APPLICATIONS

This invention is related to copending application Ser. No. 681,457, filed Dec. 14, 1984, now abandoned, assigned to the same assignee as the present invention.

BACKGROUND OF THE INVENTION

This invention relates to a method for recovering polymer from solution. More particularly, it relates to a continuous process for isolating polymer resins from solution by admixing the solution with an aqueous slurry of solid polymer particles and devolatilizing the organic solvent.

There are several methods which have been suggested for separating thermoplastic resins from organic solutions. The majority of these processes are energy intensive, requiring large quantities of steam to accomplish solvent removal. Those separation processes which are energy conservative either provide solid product of a low bulk density, provide particulate product with undesirable impurities or require complex operating equipment.

One example of an energy intensive process is that disclosed in U.S. Pat. No. 3,590,026 where solvent is removed from a rubber solution in a two-stage stripping system. In addition to the great amount of energy consumed as steam, the process requires a dispersant, which may be retained as a contaminant in the final polymeric material.

Other methods which provide undesirable particulate products are disclosed in U.S. Pat. Nos. 3,954,713 and 4,205,162. The process of U.S. Pat. No. 3,954,713 separates polycarbonate from an organic solution without the use of excessive quantities of steam by forming an emulsion of the polycarbonate solution in water which contains a "laminator", a high molecular weight polymer which increases the viscosity of water and reduces its resistance index. The threat of residual laminator remaining in the final product makes this process undesirable. The process of U.S. Pat. No. 4,205,162 separates a polymer product from solution by the addition of hot water with mild agitation. Due to the high rate of solvent removal, the particles obtained are finely divided, fluffy flakes which have a low bulk density. Such a morphology is undesirable for further processing of the polymer.

The process described by Kohyama et al in U.S. Pat. No. 4,452,976 obtains polymer products of high density by feeding a polymer solution into water in conjunction with a recycled product slurry which has been treated by a wet pulverization process. The polymer solution is then devolatilized within the water/product slurry. This process is very energy intensive in that it requires a high recycle rate to prevent clogging of the apparatus. In addition, complex equipment is required (wet pulverizer) to perform the process.

The processes described in U.S. Pat. Nos. 4,408,040 and 4,423,207 provide methods for separating polymers from solution wherein said solution is atomized with steam within an agitated vessel of hot water. The solvent is flashed off within the hot water leaving a slurry of solid polymer. These processes provide an energy efficient means for separating the polymer from solution; however, there is room for improvement. For example, these processes require unique equipment, such as a spray nozzle designed to disperse the polymer. In addition, a polymer particulate of a higher bulk density, a narrower size distribution and a lower concentration of retained volatiles is desired. A method which obtains these improvements in less complicated equipment is desired.

SUMMARY OF THE INVENTION

This invention provides a continuous process for isolating polymer resins from organic solvents, said method comprises:

(a) admixing an aqueous slurry of from 0.5 to 20 weight percent solid polymer particles of a size ranging from 1 to 500 microns and one or more organic solvents containing about 1 to 50% by weight polymer to form an admixture;

(b) volatilizing the organic solvents within the admixture while forming said admixture, the volatilization rate being sufficiently low to agglomerate the polymer resin in solution onto the solid polymer particles and form polymer granules;

(c) maintaining the weight ratio of water to total polymer within the admixture at a value within the range of about 1-50 during step (b); and (d) recovering water and solid polymer granules from the admixture.

OBJECTS OF THE INVENTION

An object of the present invention is to provide methods by which polymer resins are isolated from organic solvents with a low consumption of energy.

Another object of the present invention is to provide a continuous process for isolating polymer resins, such as polycarbonates, from solution which minimizes exposure to high temperatures which can be deleterious to product quality.

Another object of the present invention is to provide a continuous process for isolating polycarbonate resins from solution which utilizes conventional equipment.

Another object of the present invention is to obtain solid polymer granules of an optimum size and size distribution for drying and subsequent downstream processing.

A further object of the present invention is to obtain solid polymer granules which have an optimum morphology, i.e. pore size and pore volume, for drying and subsequent downstream processing.

Another object of the present invention is to obtain solid polycarbonate granules of a high bulk density and a low moisture/residual solvent content.

DETAILED DESCRIPTION OF THE INVENTION

The polymers which can be isolated from organic solvents by this process in solid, granular form generally have a molecular weight average above about 200 and typically range from about 10,000 to 50,000. The degree of polymerization can range from dimers to above 10,000. These polymers can be obtained by homopolymerization or copolymerization, by condensation reactions, addition reactions, etc. The term "polymers" as used herein refers to thermoplastic polymers, i.e. those which become plastic and flowable under the action of pressure and heat, and elastomers, i.e. those which stretch under tension and/or retract rapidly and recover their original dimensions. Examples of suitable thermoplastics include: polycarbonates, including cyclic polycarbonates; polystyrene, including high impact polystyrene and brominated derivatives of polystyrene; polyphenylene ethers; polyetherimides, polyesters, including polyethylene terephthalates and polybutylene terephthalates. Examples of suitable elastomers include ethylene propylene rubbers such as diene modified ethylene propylene rubbers, Krayton rubbers and butadiene rubbers.

An important feature of this invention is the presence of the solid polymer particles during devolatilization of the organic solvent which contains the polymer resin. The presence of the solid polymer particles provides sites for the agglomeration of resin in solution. These agglomeration sites permit the formation of high bulk density material and help avoid the formation of new finely divided, flaky particulates of a low bulk density.

The solid polymer particles within the aqueous slurry can be of any size since it is only necessary to provide solid surfaces for the polymer resin in solution to agglomerate. However, it is preferable to utilize solid polymer particles of the size within the range of about 1 to 500 microns because of the ease in handling slurries of such particles and particles of this size can accept a significant degree of agglomeration to provide a final solid granular product of a useful average size, preferably within the range of 500 to 5,000 microns. In addition, utilizing particles of this size helps prevent clogging of the apparatus and helps the process run continuously. These solid polymer particles are preferably free of impurities so as not to incorporate these impurities in the final granular product. The aqueous slurry can accommodate up to about 50% by weight solid polymer particles suspended within to be effective for use in this process. However, concentrations of less than 20% by weight are preferred. The minimum concentration of solid polymer particles within the aqueous slurry which is effective is about 0.1% by weight solid polymer. Lower concentrations of solid polymer do not provide a sufficient number of agglomeration sites to be effective. The most preferred concentration of solid polymer particles within the aqueous slurry falls within the range of about 0.5% to 5% by weight polymer. It is preferable that these particles be of a uniform size to aid in the uniformity of the final granular product of this process.

The one or more organic solvents which contain the polymer resin preferably have boiling points below 100° C. at 1 atmosphere. Although organic solvents with boiling points significantly higher than 100° C. can be utilized, a significant loss in efficiency of the process will result due to the large quantities of water which are vaporized. Where the organic solvent forms an azeotrope with water, the loss of efficiency will not be as great. Examples of solvents from which polymer resins may be isolated in accordance with the process disclosed herein are, chlorinated and brominated hydrocarbons having from 1 to 20 carbon atoms, e.g., methylene chloride, 1,1,2,2-tetrachloroethane, 1,2-dichloroethylene, chlorobenzene, chloroform, dichlorobenzene, 1,1,2-trichloroethane and aromatic and aliphatic hydrocarbon solvents such as benzene, xylene, toluene pyridine, mesitylene, hexane, pentane, heptane, and the like. Mixtures of the above solvents are also suitable and preferably, the solvents in such mixtures have boiling points within about a 40° C. range. Methylene chloride is the preferred organic solvent for use with polycarbonate resin. Toluene is the preferred solvent for both polystyrene and polyphenylene ethers.

According to the present process there may be conveniently used organic solvents having concentrations of polymer resin of up to approximately 50% by weight. Solutions of a higher concentration will be difficult to handle and disperse in the aqueous slurry due to their high viscosity and stickiness.

Solutions with lower concentrations of high molecular weight polycarbonate resin, which are directly obtained from synthesis processes carried out in the presence of a solvent, are particularly suitable for use in the practice of this invention. Exemplary of such solutions are those obtained by interfacial polycondensations of phosgene and bisphenol-A, preferably using methylene chloride as the solvent and in general containing up to about 30% by weight of a polycarbonate resin. The most preferred concentrations of polycarbonate resin within the organic solution fall within the range of about 1 to 30 weight percent. This preferred range also applies to the other polymer resins, such as polystyrene, polyphenylene ethers, polyesters, ethylene propylene rubbers, polyetherimides, Krayton rubbers, etc.

Admixing the aqueous slurry and the organic solution containing polymer resin may be conveniently achieved within any unbaffled vessel by means of an impeller. Baffles within the vessel may interfere with the agglomeration process and may not be desired. Sufficient admixing can be obtained within an unbaffled vessel by rotating an impeller at a tip speed of at least about 5 feet per second, with preferred tip speeds falling within the range of about 10 to 70 feet per second.

Volatilization of the organic solvent commences immediately upon admixing the aqueous slurry and the organic solution. Volatilization of the organic solvents is conveniently achieved by heating the admixture to a temperature within the range of from about 10° C. to 20° C. below to about 30° C. above the boiling point of the organic solvents within said organic solution.

The temperature utilized is principally determined by the organic solvents within said organic solution; however, the temperature should not exceed the glass transition temperature of the polymer to be isolated. The preferred temperatures fall within the range of about 5° C. below the boiling point of the organic solvents to 10° C. above the boiling point of these solvents. For methylene chloride, the most preferred range is about 35° C. to 55° C. at about one atmosphere pressure. For toluene, an azeotrope forms with water and the most preferred range is about 80° C. to 100° C. and for hexane, the most preferred range is about 60° C. to 75° C., at about one atmosphere pressure. The admixture may be maintained under vacuum or under a pressure. Pressures of from 0.1–2 atmospheres may be conveniently utilized; however, pressures outside this range can be utilized as desired.

The rate of volatilization determines whether the polymer resin within solution agglomerates onto the solid polymer particles of the slurry, solidifies to form new solid thermoplastic particles or forms a sticky mass.

Slow volatilization rates will permit agglomeration on the solid polymer particles. Where the rate of volatilization is too slow, the polymer resin will form a sticky glob within the admixture. The volatilization rate is effected by many variables including the ratio of water to organic solvent, the heat input (temperature) into the admixture and the extent of agitation provided within the admixture. The heat input into the admixture will control the volatilization rate most strongly.

As the heat input per unit of polymer resin increases, the volatilization rate increases. The heat input into the admixture is determined by the temperature and the volume of said admixture. Larger volumes of water per unit of polymer resin provide higher rates of volatilization at a given temperature. The volatilization rate also increases with temperature. Temperatures of about 40° C. above the boiling point of the organic solvents within the organic solution and higher can accelerate the volatilization rate to the extent where the polymer resin will not agglomerate, only form new particles. At temperatures of about 10° C. below the boiling point of the organic solvents within the organic solution or lower, the rate of volatilization will be so slow the polymer resin will form a large sticky glob. Utilizing quantities of water and organic solvent beyond the ranges specified herein will also provide undesirable volatilization rates. In addition, operating outside of the one or more preferred ranges for temperatures and polymer concentration, including solids and resin, may result in agglomeration of only a portion of the polymer resin.

The ratio of water to organic solvent is a contributing factor in determining the volatilization rate. The volatilization rate increases as the ratio of water to organic solvent increases at the same temperature. It is preferable to maintain this ratio as low as possible to enhance the efficiency of the process. A ratio having a value within the range of 10 to 0.15 is preferred.

The degree of agitation also affects the volatilization rate. The volatilization rate will be increased as agitation increases because of improved dispersion and heat transfer. In addition, the increased agitation will contribute to the heat input into the system due to heat of friction.

The weight ratio of water to total polymer, including solids and resin within solution, is maintained at a value within the range of about 1.0 to 50 and preferably 2.5–20 during this process. Weight ratios below a value of 1.0 will cause the admixture to be highly viscous and the high solids content of the effluent slurry will be difficult to handle. Weight ratios providing a value above 50 encourage high volatilization rates for the organic solvent. Maintaining the volatilization rate at a value sufficiently low to permit the polymer resin to agglomerate is difficult at such high ratios. Although some agglomeration of the polymer resin may be achieved, it is certain that this agglomeration will be accompanied by an increase in number of solid polymer particles.

The polymer granules produced may be recovered continuously from the admixture with water through a conventional outlet positioned near the top surface of the admixture. This outlet often functions as an overflow outlet for the vessel. The granules are then separated by conventional liquid-solids separation techniques, such as centrifugation, filtration, screening, and the like. These granules may be dried if desired prior to use within subsequent processing equipment. The solid polymer granules typically exhibit a low residual solvent and water content upon removal from the aqueous slurry. The solid polycarbonate granules obtained are of high density, typically having a bulk density within the range of about 0.15 to 0.60 grams per cubic centimeter.

The granule sizes typically vary over a range of about 50 to 10,000 microns when the process is operated continuously. The average size typically ranges from about 500 to 5,000 microns. The average size is dependent on the ratio of the polymer resin within the feed of organic solution to the number of polymer particles in the feed of aqueous slurry. In addition, these granules are porous and conducive to removal of water and residual solvent by conventional drying techniques.

A method for obtaining the aqueous slurry of solid polymer particles utilized in this process is to admix an organic solution of the polymer resin and water and simultaneously volatilize the organic solvents to permit solidification of the polymer resin. Volatilization is preferably achieved at a high rate so as to eliminate the growth of these particles and achieve only solidification. The weight ratio of water to polymer resin is preferably maintained above a value of about 4.0 during the formation of the aqueous slurry. Lower values for the weight ratio (high solids content) are hard to handle because of the fibrous, fluffy nature (low bulk density) of the solid particles in the effluent slurry. At high values for the weight ratio, i.e. above 1,000, particles will form but the efficiency of the process is reduced. Providing particles of a size within the range of about 1 to 500 microns for the aqueous slurry is preferred.

The organic solutions of polymer resin suitable for generating aqueous slurries are the same as those suitable for the isolation process described previously. These organic solvents may contain the same concentrations of polymer utilized in the isolation process. An example of a suitable organic solution is methylene chloride having up to 30% by weight polycarbonate generated from a conventional polycarbonate synthesis, such as an interfacial polycondensation reaction.

The production of polymer particles in the aqueous slurry is dependent on the rate of volatilization in the same manner that the rate of volatilization controls the agglomeration of polymer resin onto the polymer particles. High volatilization rates generate polymer particles because the polymer solidifies within the admixture almost immediately, eliminating the chance of agglomeration. Heat input per unit polymer solution, the ratio of water to organic solution in the feed and the degree of agitation all effect the volatilization rate. High values for these variables are desired since they increase the volatilization rate to help provide the polymer particles. Temperatures about 40° C. above the boiling point of the organic solvents and higher will ensure the elimination of agglomeration at most weight ratios of water to polymer. However, it is preferable to provide particles by operation at temperatures in the range of 5° C. to 35° C. above the boiling points of the organic solvents at high weight ratios of water to polymer. Utilizing quantities of organic solvent or water outside of the ranges described herein will make elimination of polymer resin agglomeration difficult.

The number of particles obtained is affected by the rate of agitation and the weight ratio of water to the organic solution within the admixture since these conditions affect the dispersion of the polymer resin in water. Heat input per unit polymer has little effect on the number of particulates produced since this does not control the dispersion of polymer resin in water.

Continuously stirred vessels with high impeller tip speeds can be utilized in both the isolation process of this invention and the process for generating the aqueous slurry. The vessel utilized in the process for generating the aqueous slurry may optionally contain baffles. The aqueous components of the admixtures for each process can be fed into the continuous stirred vessels through conventional inlets. The organic solutions are preferably fed at inlets near the bottom. It is preferred to maintain both feeds into the vessels continuous. For the isolation process, an aqueous slurry of solid polymer granules can be recovered from the vessel at a continuous rate and the solid granules separated from said slurry in conventional solid/liquid separation equipment where desired. The aqueous slurry produced within the continuously stirred vessel may also be recovered at a continuous rate.

An important embodiment of this invention is a semi-continuous operation where a separate source of the aqueous polymer particle slurry is not needed to provide agglomeration sites. The polymer particles are formed within the same vessel utilized for agglomeration by feeding the polymer resin into a fixed volume of water. Upon formation of the polymer particles, the subsequently fed polymer resin will agglomerate onto these particles, although the volatilization rate and process conditions remain essentially the same. Feeding and agglomeration continue until polymer granules of a desired size are obtained. In a similar embodiment the size of the granules obtained for a given volume of feed is controlled via the volatilization rate by manipulation of the feed rate and/or the rate of heat input into the system.

There may be conveniently used organic solutions having concentrations of polymer resin up to approximately 50% by weight in this embodiment. The most preferred concentrations of polymer resin falls within the range of about 10 to 30 weight %.

The organic solvents determine the temperature at which the admixture is maintained; however, the temperature should not exceed the glass transition temperature of the polymer. Temperature values for this embodiment fall within the range of about 10°–20° C. below to 30° C. above the boiling points of the organic solvents. Maintaining the temperature of the admixture within this range provides heat input rates that will permit the solidification of the polymer resin followed by agglomeration of the resin in the volume of water. The temperature of the admixture for this embodiment preferably ranges from about 5° below the boiling point of the organic solvents to about 10° above their boiling points. For methylene chloride, the preferred range is about 35° to 50° C. at one atmosphere pressure. Pressures of from 0.1–2 atmospheres may be conveniently utilized.

The rate of heat input into the system is typically constant in this embodiment since the volume of water and the temperature of the admixture remain essentially the same. However, the rate of heat input can be varied if desired by raising or lowering the temperature of the admixture within the prescribed range.

Feed rates of the solution which fall within the range of about 0.5 to 10 weight percent water per minute will match the rates of heat input prescribed above and provide both solidification and agglomeration. High feed rates ensure the formation of solid polymer granules and provide more product per unit of time. The feed rate may be varied within the prescribed range during the process. Where the rate of heat input is very high, it may become necessary to increase the feed rate after the formation of solid polymer particles to permit agglomeration to occur.

By maintaining the feed rate of the organic solvent and the rate of heat input into the system within these ranges, the volatilization rates obtained will provide solidification of the polymer resin upon initial feeding without glob formation. The solid polymer particulates formed are similar to those of the aqueous slurry of these particulates as described above. These volatilization rates will also provide agglomeration without glob formation.

The fixed volume of water is added batchwise so as not to alter the solidification and agglomeration steps during operation. To obtain particles of a narrower size distribution, it is preferable to recover substantially all of the polymer granules from the process at once. Preferably, this is achieved once a desired size is obtained.

The final concentration of solids within the fixed volume of water is maintained within the range of 5–50 percent by weight solid polymer granules. Concentrations of solids above 50 percent by weight will be difficult to handle as an effluent slurry. The preferred concentrations of polymer solids fall within the range of 10–30 percent by weight. Obtaining a final concentration of polymer solids below 5 percent by weight is undesirable since it will involve the handling of large volumes of water and the efficiency of the process is very low.

In a similar embodiment it is possible to control the size of the polymer granules obtained from a given total volume of organic solvent. This is accomplished by controlling the number of particles obtained prior to agglomeration of polymer resin onto these particles. The number of particles obtained is controlled by the selection of values for the polymer solution flow rate, rate of heat input and the degree of agitation during formation of the particles. These values may be altered once the desired number of particles are obtained to provide more efficient agglomeration. Lower values for the feed rate and higher values for agitation and temperature provide more polymer particulates. More polymer particulates will provide smaller polymer granules for a given feed of polymer solution.

It is more convenient to control the number of particulates formed by varying the feed rate since this variable can be altered quickly. However, this will reduce the productivity of the process. To obtain the desired number of particulates, the values for the feed rate of organic solution and the rate of heat input need not be selected from the ranges prescribed above for the semi-continuous operation. For example, values for the feed rate may be less than about 0.5 weight percent water per minute and values for the temperature of the admixture may be greater than 30° C. above the boiling point of the organic solvents. However, to obtain agglomeration, these values must return to the ranges described above..

It is preferable to limit the formation of polymer particulates to the initial 10% of the feed to prevent the formation of small polymer granules which are difficult to handle. It is most preferable to limit the formation of particles from about the initial 1% to 5% of the total organic solution feed since an adequate number of particles will be provided and a granular product of a suitable size is obtained.

Once the fixed volume of water contains the desired concentration of polymer solids and the desired size is obtained, the feed of organic solvent is stopped and additional organic solvent within the admixture is permitted to volatilize. The granules may then be recovered from the volume of water by conventional liquid-solids separation techniques, such as centrifugation, filtration, screening, and the like.

The following examples are provided to illustrate embodiments of this invention. It is not intended to limit the scope of this invention to the embodiments described.

Figure 1:
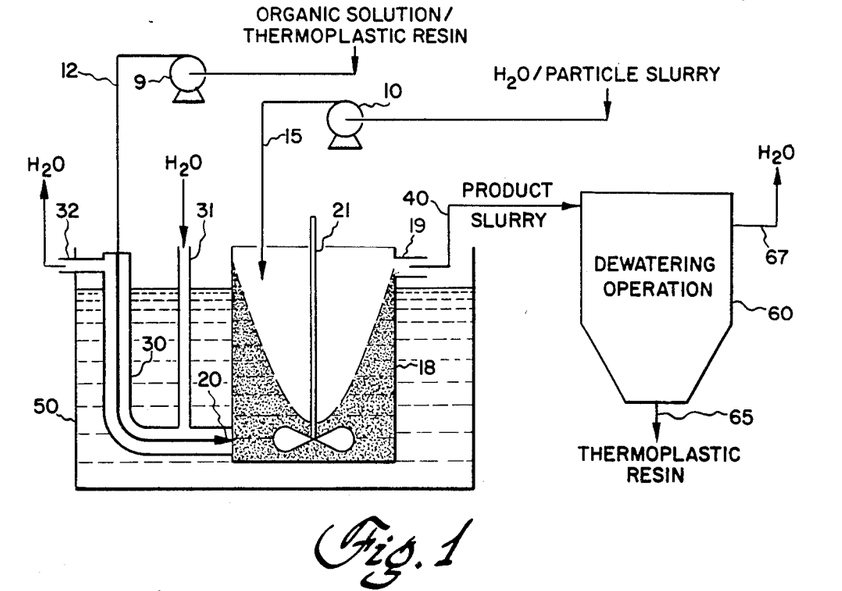
FIG. 1 is a schematic representation of an apparatus suitable for performing the process comprising this invention.

DESCRIPTION OF FIG. 1

Referring to FIG. 1 of the drawing, an organic solution of polymer resin is fed by a metering pump 9 to a volatilization vessel 18 via line 12. An aqueous slurry of polymer particles is also fed continuously into volatilization vessel 18 via line 15 by a metering pump 10. The aqueous slurry of polymer particles enters the volatilization vessel through the top while the organic solution of polymer resin enters the volatilization vessel at inlet 20 located near the bottom of the vessel. The volatilization vessel is maintained at a constant temperature by bath 50. To prevent plugging of the feed line 12, condenser 30 is used to cool the organic solution of polymer resin prior to entry in the volatilization vessel. Chilled water is fed through the condenser through inlet 31 and exits the condenser through outlet 32. The admixture is obtained within the volatilization vessel with the assistance of impeller 21. An aqueous slurry of solid polymer granules exits the volatilization vessel through outlet 19 and is transported to a dewatering operation 60 via line 40 to recover the solid polymer granules from said aqueous slurry. Water exiting the dewatering operation via line 67 may be recycled in the process and the solid polymer granules exiting via line 65 are transported to further processing steps such as dewatering, drying and/or extrusion.

EXAMPLE 1

To model the apparatus illustrated in FIG. 1, an unbaffled, glass vessel (4⅝" diameter×10" inch) was used as the volatilization vessel. An inlet port was located near the bottom for feeding a methylene chloride solution of 15% by weight polycarbonate. An outlet port was located near the top for the continuous withdrawal of the aqueous granular slurry as overflow. The vessel was open to the atmosphere and an aqueous slurry of 3% by weight polycarbonate particles was fed through the top of the glass vessel. The particles fed into the glass vessel were very fibrous and fine with a bulk density of about 0.05 gms/cc. For start up, 1000 ml of the aqueous slurry of 3% polycarbonate particles of a similar morphology as those within the feed was introduced into the vessel. The polycarbonate solution was fed continuously at a rate of about 15 ml/min and the aqueous slurry of polycarbonate particles was fed continuously at a rate of about 20.5 ml/min with the help of metering pumps. To maintain the temperature of the system at a constant 40° C., the vessel was immersed in a constant temperature water bath. The feed line for the polycarbonate solution was cooled within the constant temperature bath with a condenser coil to avoid plugging of the feed line. A single strip impeller (3⅜" diameter×½" width×1/16" thick) was used within the glass vessel to agitate the contents. The impeller tip speed was about 30 ft/sec.

The outlet port overflow rate was about 23 ml/min of the aqueous granular slurry. In less than three hours a steady state appeared to have been reached and there was no visible difference in the particle size or shape between the 3 hour and 9 hour product samples recovered from the glass vessel. Solids recovered continuously from the glass vessel between 3 hours and 9 hours were granular in shape with a bulk density of about 0.35 grams per cubic centimeter.

EXAMPLE 2

The apparatus utilized for this semi-continuous process modeled that of FIG. 1 except water was introduced batchwise into the volatilization vessel without an aqueous slurry of polymer particles and the product slurry was not continuously withdrawn. The same volatilization vessel, impeller, temperature bath, condenser coil, and metering pump as used in Example 1 were used here.

The bath temperature was controlled to maintain the temperature of the vessel contents at about 40° C. throughout the run. The impeller speed was kept at 4000 rpm throughout the run also. A 1,000 milliliter volume of water (at 40° C.) was charged into the volatilization vessel. The polymer resin feed solution utilized was 15% polycarbonate in methylene chloride. The feed polycarbonate solution was fed continuously into the vessel at a rate of 18 milliliters per minute for about 30 minutes. An external source of polymer particulate was not utilized and the product slurry was recovered batchwise. Following which the feed organic solution was cut off and the system was run for another 5 minutes to volatilize additional methylene chloride within the vessel. The granular slurry was then drained, centrifuged and dried to recover polycarbonate granules. The granules were very uniform in size with about 90% of the particles having a size within the range of about 1500 to 2400 microns. The granules exhibited a bulk density of about 0.35 gm/cc. Further details as to the particle size distribution are provided in Table 1, where a comparison is made of the particle size distribution obtained from the embodiments illustrated by Examples 1, 2, and 3 herein.

EXAMPLE 3

The same apparatus as used in Example 2 was used here to perform another semi-continuous process wherein water is introduced batchwise and the polymer solution is fed at varying rates and the product slurry is withdrawn batchwise.

The bath temperature was controlled to maintain the temperature of the vessel contents at about 43° C. and the stir speed of the impeller was kept at 3,000 rpm throughout the run. A 1,000 milliliter volume of water having a temperature of about 43° C. was charged into the vessel. The polycarbonate feed solution utilized was 15% polycarbonate in methylene chloride. The feed polycarbonate solution was fed continuously into the vessel at a rate of 5 milliliters per minute for about 5 minutes. An external source of polycarbonate particles was not utilized. The feed polycarbonate solution flow rate was then increased to 20 milliliters per minute for 30 minutes, following which the polycarbonate solution was cut off and the system was run for another 10 minutes to volatilize additional methylene chloride within the vessel. The granular slurry was then drained, centrifuged and dried to recover polycarbonate granules. The granules were very uniform in size with 90% of the particles having a size within the range of about 1,000 to 2,000 microns. The granules exhibited a bulk density of about 0.34 grams per cubic centimeter. Further details as to the particle size distribution are provided in Table 1.

TABLE 1

Comparison of the Polycarbonate Particle Size Distribution

| Particle Size | Wt. % Smaller Than the Stated Size | | |
|---|---|---|---|
| | Example 2 | Example 3 | Example 1 |
| 710μ | 0 | 0 | 1 |
| 1000μ | 0.9 | 7 | 5 |
| 1180μ | 3.0 | 15 | 9 |
| 1700μ | 42 | 74 | 49 |
| 2000μ | 72 | 93 | 67 |
| 2360μ | 95 | 99 | 77 |
| 2800μ | 100 | 100 | 92 |
| 3360μ | 100 | 100 | 97 |
| 3600μ | 100 | 100 | 99 |
| 3800μ | 100 | 100 | 100 |

The above data illustrates that the semi-continuous batch processes described in Examples 2 and 3 provide a granular polymer product with a narrower particle size distribution than that obtained in the continuous process described in Example 1 where 90% of the granules had a size within the range of 700-2800 microns. This compares to a range of 1500-2400 microns for the granules from Example 2 and a range of about 1000-2000 microns for granules obtained from Example 3. This data also illustrates that utilizing a high volatilization rate during the initial feed of polymer resin to produce more polymer particles gives smaller granules for the same total organic feed.

Figure 2:
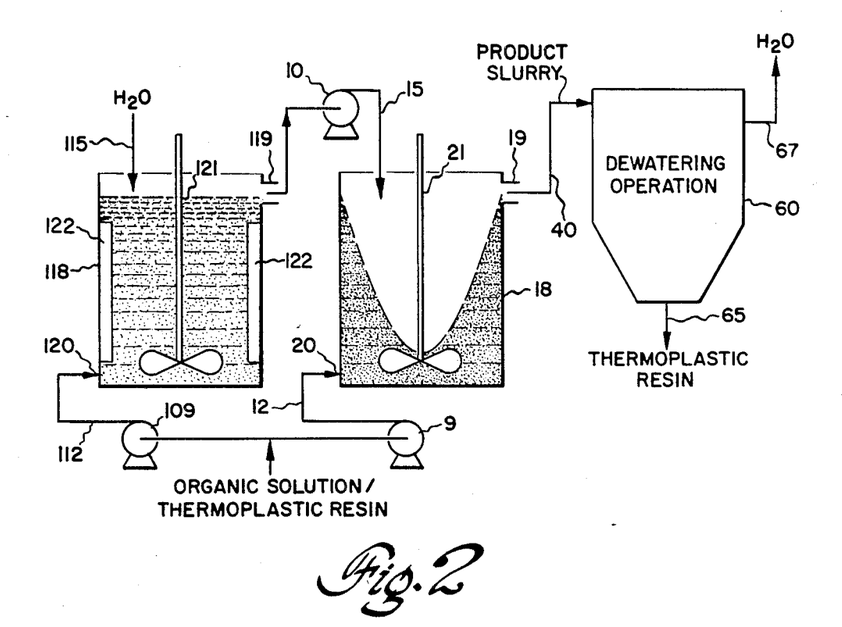
FIG. 2 is a schematic representation of another apparatus suitable for performing the process of this invention which incorporates a process for generating an aqueous slurry of polymer particles.

DESCRIPTION OF FIG. 2

Referring to FIG. 2, an apparatus for performing the process of this invention is illustrated wherein a continuous source of the aqueous slurry of solid polymer particles is provided for the continuous process detailed in Example I. This slurry is produced in a preliminary volatilization vessel 118. This slurry exits the preliminary volatilization vessel through outlet 119 and is transported to an apparatus as described in FIG. 1, which is illustrated in FIG. 2 also. Water is fed into the preliminary volatilization vessel via line 115 and an organic solution of the polymer resin is introduced at inlet 120 via line 112 with the help of metering pump 109. The organic solution of polymer resin is derived from the same source as that which feeds the volatilization vessel 18. Impeller 121 serves to provide the admixture within the preliminary volatilization vessel. Baffles 122 are optional and where used will provide assistance in forming the admixture. The remaining elements in FIG. 2 downstream of lines 15 and 12 are the same as those shown in FIG. 1 and are defined above.

EXAMPLE 4

To model the portion of the apparatus shown in FIG. 2 which generates the aqueous slurry, an unbaffled, glass vessel (4⅝" diameter×10" high) with an inlet port near the bottom and an outlet port near the top as shown in FIG. 1 was utilized for the preliminary volatilization vessel. The vessel was kept open to the atmosphere and water was fed continuously from the top. The feed materials were fed continuously to the system with the help of metering pumps. A methylene chloride solution of 15% polycarbonate was fed through the inlet port near the bottom. The vessel was maintained at a constant temperature of 50° C. by immersion in a water bath. The feed line for the methylene chloride solution was chilled within the water bath with a condenser. A single strip impeller (3⅝" diameter×½" width×1/16" thick) was used within the preliminary volatilization vessel to provide agitation. For start up, 1,000 grams of water were initially charged in the preliminary volatilization vessel.

Water was fed into the glass vessel at 20 ml per minute and the methylene chloride solution was fed at a rate of 3 ml per minute. The impeller was operated at a tip speed of 45 ft. per second. A steady state was reached in the preliminary volatilization vessel within 1 hour. There was no visible difference in the particle size and shape between 1 hour and 9 hour product samples. The recovered particles were very fibrous and fine with a bulk density of about 0.05 grams per cubic centimeter. These particles were then fed as part of a water slurry into a volatilization vessel for the process described in Example 1 which provided polycarbonate solids after filtration which were granular in shape with a bulk density of about 0.35 grams per cubic centimeter.

EXAMPLES 5-8

These examples demonstrate that a variety of polymers can be isolated by this invention. In Examples 5-8 an apparatus modified from that shown in FIG. 1 was utilized. Instead of maintaining the vessel temperature with a temperature bath, steam was injected into the vessel. The same glass vessel described in Example 1 was used here except an inlet for steam was located at the bottom. The same impeller and metering pump were utilized; however, the temperature bath and condenser were unnecessary.

For Example 5 the feed solution consisted of 15% polyphenylene ether in toluene which was fed continuously into the volatilization vessel at a rate of 15 ml/min. The volatilization vessel was changed with 700 ml of an aqueous slurry consisting of 2.5% by weight polyphenylene ether particles. A continuous feed of a similar 2.5% aqueous slurry was introduced into the volatilization vessel at 15 ml/min. The product was continuously withdrawn from the vessel as an overflow. The temperature of the admixture was maintained at 92° C. and the impeller speed was 25 ft/sec. A steady state was reached in 3 hours. There was no visible difference in granule size or shape between the 3-hour and 9-hour product samples. The polyphenylene ether granules had a bulk density of 0.30 gm/cc.

To obtain the aqueous slurry of polyphenylene ether particles, a 12% toluene solution of polyphenylene ether was fed into the volatilization vessel described above filled with water. The organic solution was fed at 3 ml/min and water was fed at 15 ml/min. Overflow was continuously withdrawn near the top. The vessel contents were maintained at 99° C. and the impeller had a tip speed of 40 ft/sec. The run was continued for 9 hours with a steady state being obtained in 1 hour. The resulting particles were very fibrous and fine with a bulk density of about 0.03 gm/cc.

For Example 6, the feed solution consisted of high impact polystyrene in toluene. The process was performed with the same apparatus as used in Example 5. The volatilization vessel was initially charged with a 700 ml aqueous slurry of 2.5 wt % high impact polystyrene particles. The temperature of the vessel contents was 95° C. and the impeller tip speed was 30 ft/sec. The toluene solution of high impact polystyrene was fed at a rate of 15 ml/min. The flow of aqueous slurry (2.5 wt % high impact polystyrene particles) was maintained at 15 ml/min. A steady state was reached in 3 hours and the product from the 3-hour to 9-hour continuous run was granular with a bulk density of about 0.40 gm/cc.

The aqueous slurry was obtained by operating the vessel at 99° C. with an impeller speed of 40 ft/sec and an initial charge of 700 ml water. Water flow into the vessel was maintained at 15 ml/min and the solution flow was 3 ml/min. The particles resulting from a 7-hour continuous run were fibrous and fine with a bulk density of about 0.06 gm/cc.

For Example 7, the feed solution consisted of a hexane solution of 10% ethylene propylene diene modified rubber. The volatilization vessel as used in Example 5 was charged with 1000 ml of an aqueous slurry of 2% by weight ethylene propylene diene modified rubber (EPDM) particles. The vessel was maintained at 70° C. with an impeller speed of 25ft/sec. The hexane/EPDM solution was fed continuously at 18 ml/min while an aqueous slurry (2% by wt EPDM) was continuously fed at 24 ml/min. Product was recovered continuously over 7 hours. The granular product had a bulk density of 0.30 gm/cc.

The aqueous slurry of EPDM particles was obtained as in Examples 5 and 6 by an initial charge of 1000 ml water into the vessel, a vessel temperature of 85° C. and impeller speed of 40 ft/sec, a solution feed of 5 ml/min and an aqueous feed of 25 ml/min. The product recovered was fine and had a bulk density of 0.10 gm/cc.

For Example 8, a similar apparatus and procedure as described in Examples 5-7 was utilized. The feed solution for Example 8 consisted of a methylene chloride solution of 15% by weight cyclic polycarbonate having an average molecular weight of 1200. The following operating conditions were maintained to provide a continuous granular polycarbonate product over 7 hours with a bulk density of 0.45 gm/cc:

(1) initial charge in vessel: 1000 ml aqueous slurry (3 wt % polycarbonate particles),
(2) vessel temperature: 45° C.,
(3) impeller tip speed: 20 ft/sec,
(4) continuous feed of cyclic polycarbonate resin methylene chloride: 15 ml/min, and
(5) continuous feed of aqueous slurry (3% cyclic, polycarbonate particles): 20.5 ml/min.

To obtain a particle slurry for cyclic polycarbonate having a bulk density of 0.08 gm/cc over 7 hours, the apparatus of Examples 5-7 was utilized with the following process conditions:

(1) initial charge: 1000 ml water,
(2) vessel temperature: 55° C.,
(3) impeller tip speed: 40 ft/sec,
(4) continuous feed of cyclic polycarbonate resin/-methylene chloride: 3 ml/min, and
(5) continuous feed of water: 20 ml/min.

Although the above examples have shown various embodiments of the present invention, modifications of these embodiments will be obvious to those skilled in the art, including the use of other polymer systems and are considered within the scope of this invention.

What is claimed is:

1. A process for isolating polymer resin from organic solvent which comprises
(a) admixing an aqueous slurry of from 0.5 to 20 weight percent solid polymer particles of a size ranging from 1 to 500 microns and one or more organic solvents, having dissolved therein about 1 to 50% by weight polymer resin to form an admixture;
(b) volatilizing the organic solvents within the admixture while forming said admixture, the volatilization rate being sufficiently low to agglomerate the polymer resin in solution onto the solid polymer particles and form solid polymer granules;
(c) maintaining the weight ration of water to total polymer within said admixture at a value in the range of about 1 to 50 during step (b); and
(d) recovering water and solid polymer granules from the admixture.

2. A method as in claim 1 wherein the aqueous slurry contains about 0.5 to 10 weight % polymer particles.

3. A method as in claim 1 wherein the organic solvents contain about 10% to 30% by weight polymer resin.

4. A method as in claim 1 wherein the weight ratio of water to total polymer is maintained at a value within the range of about 2.5 to 20.

5. A method as in claim 1 wherein the organic solvents are selected from the group consisting of methylene chloride, 1,1,2,2-tetrachloroethane, 1 2-dichloroethylene, chloroform, 1,1,2-trichloroethane, pyridine, chlorobenzene, dichlorobenzene, benzene, xylene, toluene, mesitylene, hexane, heptane, and pentane.

6. A method as in claim 1 wherein admixing is achieved by a rotating impeller within an unbaffled vessel having a tip speed of at least about 5 feet per second.

7. A method as in claim 6 wherein said rotating impeller a tip speed of about 10 to 70 feet per second and the one or more organic solvents containing polymer resin is fed at an inlet located at the bottom of said vessel.

8. A method as in claim 1 wherein the solid polymer granules are recovered at a point near the top surface of the admixture.

9. A method as in claim 1 wherein volatilization of the one or more organic solvents is accomplished by maintaining the admixture at a temperature within the range of about 10° C. below to 30° C. above the boiling point of the organic solvents.

10. A method as in claim 1 wherein the one or more organic solvents are comprised of methylene chloride and volatilization is accomplished by maintaining the admixture at a temperature within the range of about 30° to 70° C. at atmospheric pressure.

11. A method as in claim 10 wherein the methylene chloride solution contains about 10 to 30 weight percent polycarbonate resin, the weight ratio of water to total polycarbonate within said admixture has a value within the range of 2.5 to 20 and the temperature of the admixture is maintained within the range of about 38° to 55° C. at one atmosphere pressure or less.

12. A method as in claim 11 wherein the polycarbonate is primarily cyclic, low molecular weight polycarbonate.

13. A method as in claim 1 wherein the organic solvents are comprised of toluene and volatilization is accomplished by maintaining the admixture at a temperature within the range of about 85° C. to 100° C. at atmospheric pressure.

14. A method as in claim 13 wherein the toluene solution contains about 10 to 30 weight percent polyphenylene ether resin, the weight ratio of water to total polyphenylene ether within said admixture has a value within the range of 2.5 to 20 and the temperature of the admixture is maintained below 100° C.

15. A method as in claim 13 wherein the toluene solution contains about 10 to 30 weight percent polystyrene resin, the weight ratio of water to total polystyrene within said admixture has a value within the range of 2.5 to 20 and the temperature of the admixture is maintained below 100° C.

16. A method as in claim 1 wherein the organic solvents are comprised of hexane and volatilization is accomplished by maintaining the admixture at a temperature within the range of about 60° to 75° C. at atmospheric pressure.

17. A method as in claim 16 wherein the hexane solution contains about 5 to 20 weight percent ethylene propylene rubber resin and the weight ratio of water to total ethylene-propylene-rubber within said admixture has a value within the range of 2.5 to 20.

18. A method as in claim 1 wherein said aqueous slurry of solid polymer particles is provided by a process comprising
(a) admixing water with one or more organic solvents containing about 1 to 50 weight percent polymer resin to form an admixture;
(b) volatilizing the organic solvents within the admixture to solidify the polymer resin within solution; and
(c) maintaining the weight ratio of water to polymer resin within the admixture at a value above about 5.0 during step (b).

19. A method as in claim 18 wherein the weight ratio of water to polymer resin within said admixture is maintained at a value in the range of about 10 to 100.

20. A method as in claim 18 wherein the one or more organ solvents contain about 10% to 30% by weight polymer resin.

21. A method as in claim 18 wherein the organic solvents are selected from the group consisting of methylene chloride, 1,1,2,2-tetrachloroethane, 1,2-dichloroethylene, chloroform, 1,1,2-trichloroethane, chlorobenzene, pyridine, dichlorobenzene, benzene, hexane, pentane, heptane, xylene, toluene and mesitylene.

22. A method as in claim 18 wherein admixing is achieved a rotating impeller within a vessel having a tip speed of at least about 5 feet per second.

23. A method as in claim 22 wherein said rotating impeller has a minimum tip speed of about 10 to 70 feet per second.

24. A method as in claim 18 wherein the organic solvents contain about 10 to 30 weight percent polycarbonate, the weight ratio of water to polycarbonate resin has a value within the range of about 10 to 200 and volatilization is achieved by maintaining the admixture at a temperature within the range of about 0° to 35° C. above the boiling point of the organic solvents.

25. A method as in claim 18 wherein the organic solvents are comprised of toluene that contains about 10 to 30 weight percent polystyrene, the weight ratio of water to polystyrene resin has a value in the range of about 10 to 200 and volatilization is achieved by maintaining the admixture at a temperature within the range of about 95° to 100° C.

26. A method as in claim 18 wherein the organic solvents are comprised of toluene and contain about 10 to 30 weight percent polyphenylene ether, the weight ratio of water to polyphenylene ether resin has a value in the range of about 10 to 200 and volatilization is achieved by maintaining the admixture at a temperature in the range of 95° to 130° C.

27. A method as in claim 18 wherein the organic solvents are comprised of hexane and contain about 10 to 30 weight percent ethylene-propylene rubber, the weight ratio of water to rubber has a value within the range of 10 to 200 and volatilization is achieved by maintaining the admixture at a temperature within the range of 65° to 90° C.

28. A method as in claim 24 wherein the one or more organic solvents are comprised of methylene chloride and the temperature of the admixture is maintained within the range of about 45° C. to 75° C. at atmospheric pressure.

29. A method as in claim 1 wherein the one or more organic solvents are comprised of a methylene chloride solution of polycarbonate obtained from a polycarbonate polymerization process.

30. A method as in claim 1 wherein all steps are performed continuously.

31. A method as in claim 18 wherein the one or more organic solvents are comprised of a methylene chloride solution of polycarbonate obtained from a polycarbonate polymerization process.

32. A method as in claim 18 wherein all steps are performed continuously.

33. A method as in claim 1 wherein
(a) the admixture is formed by feeding, with agitation, one or more organic solvents containing about 1 to 50% by weight polymer resin into a fixed volume of water at a rate within the range of about 0.5 to 10 weight % water per minute to provide a final concentration of solid polymer granules within the range of about 5–50 percent by weight;
(b) the organic solvent is volatilized during formation of the admixture by maintaining the temperature of the admixture during feeding within the range of about 10° C. below to about 30° C. above the boiling point of the organic solvents; and
(c) substantially all of the solid polycarbonate granules are recovered from the admixture upon volatilization of a substantial portion of the organic solvent.

34. A method as in claim 33 wherein the organic solvent contains about 10% to 30% by weight polycarbonate resin.

35. A method as in claim 34 wherein the final concentration of polycarbonate solids within the volume of water falls within the range of about 10 to 30% by weight.

36. A method as in claim 35 wherein the organic solvent containing polycarbonat is fed at a rate which provides a net feed within the range of about 1 to 5 Weight % per minute, based on water.

37. A method as in claim 36 wherein the organic solvent is methylene chloride and the admixture is maintained at a temperature in the range of about 35° to 50° C. at about 1 atmosphere pressure.

38. A method as in claim 37 wherein the methylene chloride solution contains about 10 to 30 weight percent polycarbonate and the feed rate of this methylene chloride falls within the range of about 0.5 to 2 weight percent per minute, based on water.

39. A method as in claim 1 wherein
(aa) the aqueous slurry is obtained by feeding, with agitation, up to 10% of one or more organic solvents containing 1 to 50% by weight polymer resin into a fixed volume of water at a rate less than the feed rate of step (bb);

(bb) the admixture is obtained by feeding, with agitation, the remaining portion of the organic solvents containing polymer resin into the aqueous slurry formed in step (aa) at a rate within the range of about 0.5 to 10 weight % water per minute to provide a final concentration of solid polymer granules within the range of 2-50 percent by weight;

(cc) the organic solvent is volatilized during formation of the aqueous slurry and the admixture by maintaining their respective temperatures in the range of about 10° C. below to 30° C. above the boiling point of the organic solvents, and (dd) substantially all of the solid polycarbonate granules are recovered from the admixture upon volatilization of a substantial portion of the organic solvent.

40. A method as in claim 39 wherein 2.5 to 5% of the organic solvents are fed into volume of water during step (aa).

41. A method as in claim 39 wherein the organic solvent is comprised of methylene chloride and the aqueous slurry and admixture are maintained at temperatures in the range of about 35° to 50° C. at about one atmosphere.

42. A method as in claim 41 wherein the methylene chloride contains about 10 to 30 weight % polycarbonate resin, the final concentration of solid polycarbonate granules within the volume of water falls within the range of about 10 to 30 weight percent, the feed rate of methylene chloride during step (aa) falls within the range of about 0.1 to 0.5 weight percent water per minute and the feed rate of methylene chloride during step (bb) falls within the range of about 1 to 3 weight percent water per minute.

* * * * *